Patented Nov. 8, 1927.

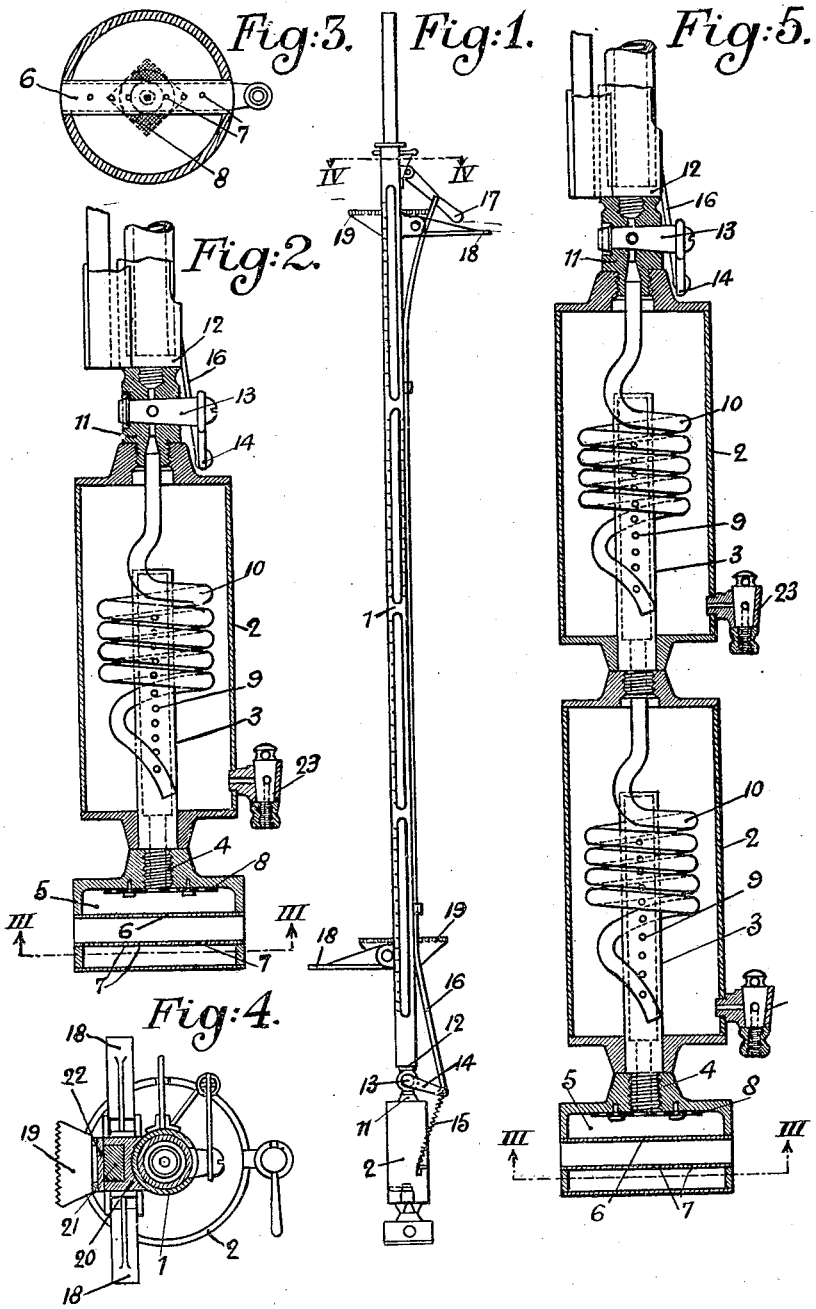

1,648,382

UNITED STATES PATENT OFFICE.

HENRICUS FROGER, OF THE HAGUE, NETHERLANDS, ASSIGNOR TO THE FIRM OF COMMANDITAIRE VENNOOTSCHAP FROGER'S ELECTRICITEILS MAATSCHAPPIJ, OF ARNHEM, NETHERLANDS.

APPARATUS FOR INDICATING VARIATIONS OF IMMERSION DEPTH OF SHIPS AND THE WEIGHT OF SHIPS' CARGOES.

Application filed January 16, 1925, Serial No. 2,953, and in the Netherlands January 18, 1924.

For computing the weight of a ship's cargo it is usual to measure the variation in the displacement of water by the loaded ship, and for that purpose to measure the depth of immersion with regard to a fixed datum line. This immersion is commonly indicated by the position of the water level in a glass gauge tube, but wave motion is liable to cause fluctuations of this water level, and it is then difficult to obtain accurate readings. Even a slight inaccuracy in the reading of the gauge may lead to a large error in computing the weight of the cargo, to the serious detriment of the customs, shipper, or consignee.

The fluctuation of the water level in the gauge can be reduced by damping the inflow and outflow of water, and according to my invention means are provided for effecting this damping on two or more stages, that is to say two or more damping devices are provided in series.

We may arrange the first of the said damping devices in a box or chamber which is immersed in and open to the surrounding water, so that the water must pass through the said chamber on its way to the gauge tube.

Between this chamber and the gauge tube we may dispose a further damping device or any suitable number of damping devices whereby the direction of flow of the water is repeatedly changed the velocity of the water being by that means reduced.

The first damping device in the series may be a perforated tube extending transversely through an immersed box and having its open ends fitted into holes in the box wall. We may connect this box, as by a screw or other joint to a chamber located above it, and provide in this chamber a perforated tube, so that the ascending water flows into the chamber by way of the said perforated tube. A sieve may be provided in a suitable position, say at the mouth of the connection, to retain any solid matter that may be carried by the water. Within the chamber above the box we may have a coiled pipe one end of this pipe being open to the interior of the chamber, and the other end affording the only outlet from the chamber for flow of water to the gauge tube. Hence the ascending water must flow through this coiled tube, and the rate of flow is retarded by the circuitous path thus imposed. The pipe may be coiled around the perforated tube by way of which the water enters the chamber, the tube being vertical and the perforations being confined to a portion thereof which is above the level of the lower or intake end of the coiled pipe, so that there can be no more or less direct upward flow of water from any perforation to the intake end of the coiled pipe. The coiled pipe may lead directly to the bottom of the gauge glass tube, or it may lead to the vertical perforated tube of another similar chamber, wherefrom a similar coiled pipe leads to the gauge glass tube.

Two examples of apparatus according to the invention are shown in the annexed drawings, in Figs. 1 to 4 and Fig. 5 respectively, Fig. 3 being, however, a view which is common to both forms of construction.

Fig. 1 is an elevation of the first form of construction.

Fig. 2 is a vertical section of a portion thereof, to a larger scale, showing some parts in elevation.

Fig. 3 a section on the line III—III of Fig. 2 or Fig. 5 and

Fig. 4 a section on an enlarged scale on the line IV—IV of Fig. 1.

Fig. 5 is a vertical section, showing some parts in elevation of a portion of the second example, which differs from the first only in that part of the instrument is duplicated, to produce an additional damping effect.

Referring first to Figs. 1 to 4, 1 is the glass gauge tube, on which a scale is marked. Connected to the bottom of this tube by means which will be described hereinafter, is a cylindrical chamber 2 within which is a vertical perforated tube 3 closed at the top and having at the bottom a screw threaded nipple 4, projecting out of the chamber, for connection to the box 5. The latter contains a horizontal tube 6, whose ends are fitted into holes in the wall of the box. This tube 6 has perforations 7 in the bottom portion thereof, the top portion, facing the nipple 4, being imperforated. A sieve 8 is fixed across the mouth of the nipple 4. The box 5 being immersed in the sea, water enters it by way of the tube 6 and perforation 7, the latter damping the inflow.

The tube 6 thus constitutes the first damping device. The water ascends through the nipple 4 into the tube 3 and issues from the perforations 9 of the latter into the chamber 2. Within the chamber 2 there is a pipe 10, preferably coiled around the tube 3, with its lower end below the level of the lowest perforation 9. The upper end of the pipe 10 extends into a union 11, which is connected at 12 to the gauge tube 1 and contains a cock 13 actuable by a lever 14. The cock is normally held closed by a spring 15, but the lever 14 is connected by a rod 16 to a hand lever 17 near the top of the gauge, enabling the cock to be opened or closed by hand.

It will be apparent that when the apparatus is partly immersed and the cock is open, water will ascend from the pipe 10 into the gauge tube 1, in which it rises to sea-level. The tube 3 and pipe 10 constitute the second damping device in this instrument. It is understood that in operation the gauge tube is secured in any suitable manner and preferably in a substantially vertical position in any convenient part of the ship, for instance, near the side thereof with the lower open end below the level at which the ship floats when unloaded.

The instrument is fitted with brackets 18 and 19 which may also be hinged brackets for adjusting it in respect to certain ledges on the ship's side, and for increasing its effective length there is a channeled guide 20 alongside the gauge tube with a slidable rod 21 therein, retained by a cover 22. There is a discharge cock 23 near the bottom of the chamber 2, enabling the gauge tube to be emptied quickly after a reading has been taken.

In the example shown in Fig. 5 there are two chambers 2 connected in series, and each containing a perforated tube 3 and coiled pipe 10, so that including the perforated tube 6 at the bottom this instrument has three damping devices. It will be understood that any convenient number of damping devices may be placed in series in this or an equivalent manner, according to the damping effect required.

What I claim is:

1. A ship immersion depth measuring device, comprising, a plurality of separate chambers connected for communication one with the other in series, a water flow damping device in each chamber for effecting damping the flow therethrough, the damping device in the first chamber including a transverse perforated tube having open ends received in holes in the wall of the chamber.

2. A ship immersion depth measuring device, comprising, a plurality of separate chambers connected for communication one with the other in series, a water flow damping device in each chamber for effecting damping the flow therethrough, the damping device in all but the first chamber including, a perforated water inlet tube for the chamber and a coiled outlet pipe, the lower end of the outlet pipe being positioned below the level of the lowest perforation in the inlet tube.

3. A ship immersion depth measuring device, comprising, a plurality of separate chambers connected for communication one with the other in series, a water flow damping device in each chamber for effecting damping the flow therethrough, the damping device in the first chamber including, a tube in the chamber, and having its lower side perforated and its upper side imperforated, the imperforated side of the tube facing the passage leading to the next damping device of the series.

4. A ship immersion depth measuring device, comprising, in combination, a water level gauge including a graduated tube, a chamber at the lower end of said tube, a helical pipe in the chamber, open at its lower end and in communication with the gauge tube at its upper end, a vertical inlet pipe in the chamber closed at its upper end and laterally perforated and extending within the pipe turns of the helical pipe with its lowermost perforation positioned above the level of the lower open end of the helical pipe, a further chamber communicating with the lower end of the vertical inlet pipe, and damping means in the further chamber.

5. A ship immersion depth measuring device, comprising, in combination, a water level gauge including a graduated tube, a chamber at the lower end of said tube, damping means in the chamber in communication therewith, a further chamber in communication with the damping means in the first chamber, a transverse open ended tube extending across the further chamber and opening to the outside thereof and constituting additional damping means.

6. A ship immersion depth measuring device, comprising, in combination, a water level gauge including a graduated tube, a chamber at the lower end of said tube, a helical pipe in the chamber open at its lower end, and communicating with the gauge tube at its lower end, a vertical inlet pipe in the chamber with a closed upper end and perforated laterally, and extending within the pipe turns of the helical pipe with its lowermost perforation positioned above the level of the lower open end of the helical pipe, a further chamber communicating with the lower end of the vertical pipe, and a transverse open ended tube extending across the further chamber and opening to the outside thereof, the transverse tube being perforated on its side remote from said chamber.

7. A ship immersion depth measuring device, comprising, in combination, a water level gauge including a graduated tube, a chamber at the lower end of said tube, a helical pipe in the chamber communicating with the gauge tube at its lower end, a vertical inlet pipe in the chamber with closed upper end and perforated laterally, the vertical pipe extending within the pipe turns of the helical pipe, and having its lowermost perforation arranged above the level of the lower open end of the helical pipe, a further chamber communicating with the lower end of the vertical pipe, a sieve in the line of communication between the chambers, a transverse open ended tube extending across the further chamber and opening to the outside of the chamber, the transverse tube being perforated on the side remote from the sieve.

8. A ship immersion depth measuring device, comprising, in combination, a water level gauge including a graduated tube, a chamber at the lower end of said tube, a helical pipe in the chamber communicating with the gauge tube at its lower end, a vertical inlet pipe in the chamber with a closed upper end and perforated laterally, the vertical inlet pipe extending within the pipe turns of the helical pipe and positioned to have its lowermost perforation above the level of the lower open end of the helical pipe, a further chamber communicating with the lower end of the vertical pipe, a sieve in the line of communication between the chambers, a transverse open ended tube extending across the further chamber and opening to the outside thereof, the transverse tube being perforated on the side remote from the sieve, a cock at the base of the graduated tube, and manipulating means for the cock arranged in proximity to the upper end of the graduated tube.

In testimony whereof I have affixed my signature.

HENRICUS FROGER.